Feb. 10, 1942. C. A. FOX 2,272,370
ELECTRICAL PROTECTIVE DEVICE
Filed June 10, 1939 2 Sheets-Sheet 1
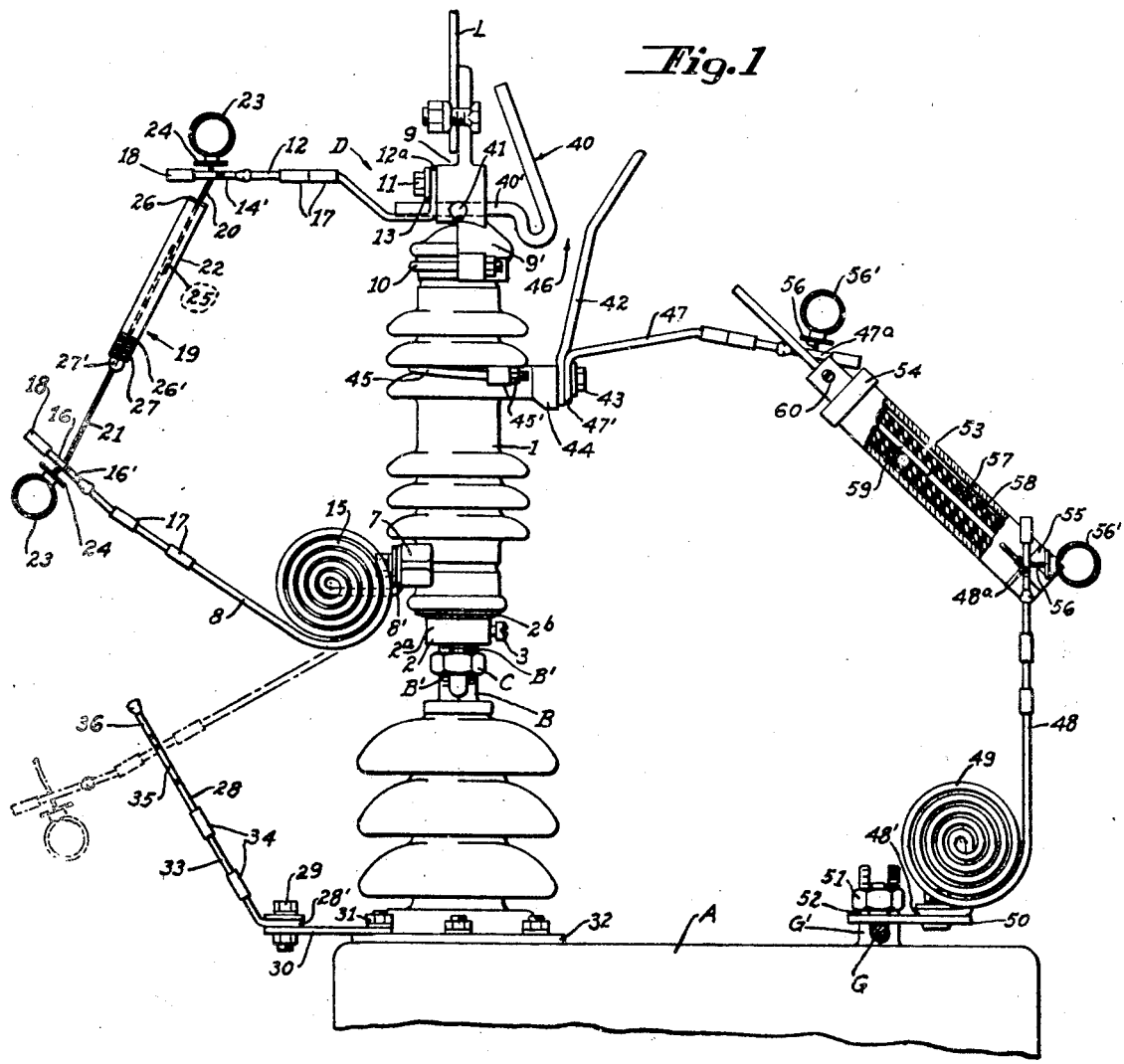
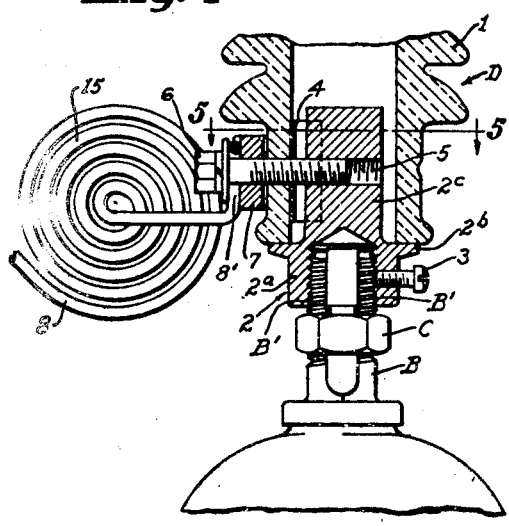
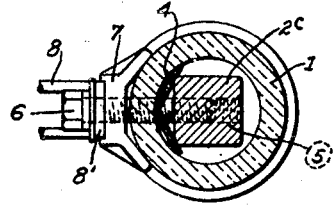
INVENTOR
CHARLES ADIN FOX
BY
ATTORNEY Feb. 10, 1942.   C. A. FOX   2,272,370
ELECTRICAL PROTECTIVE DEVICE
Filed June 10, 1939   2 Sheets-Sheet 2
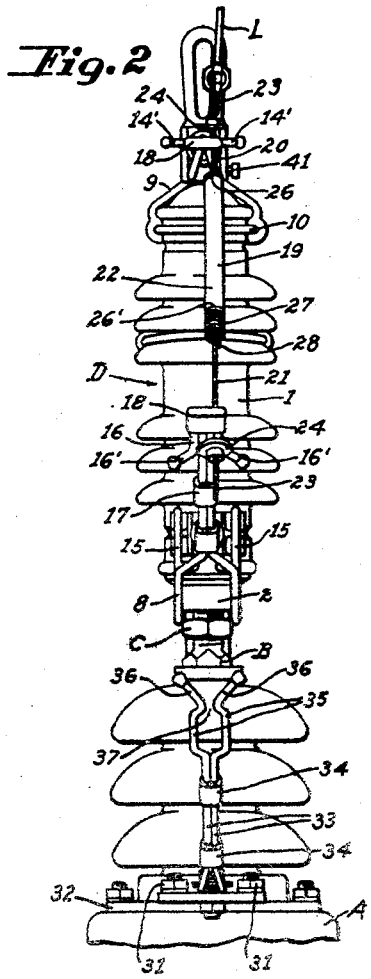
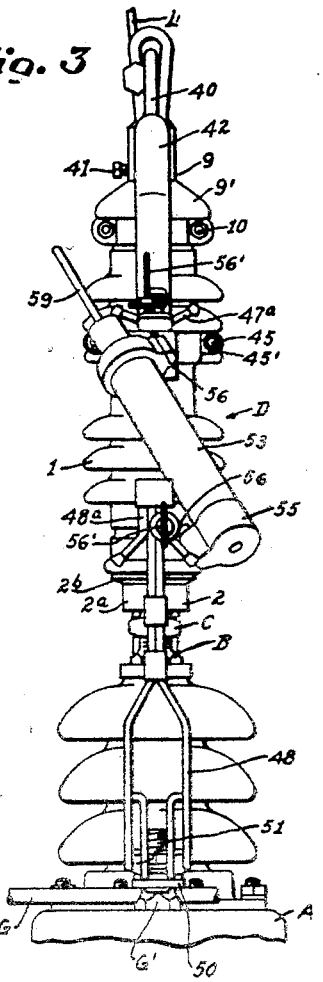
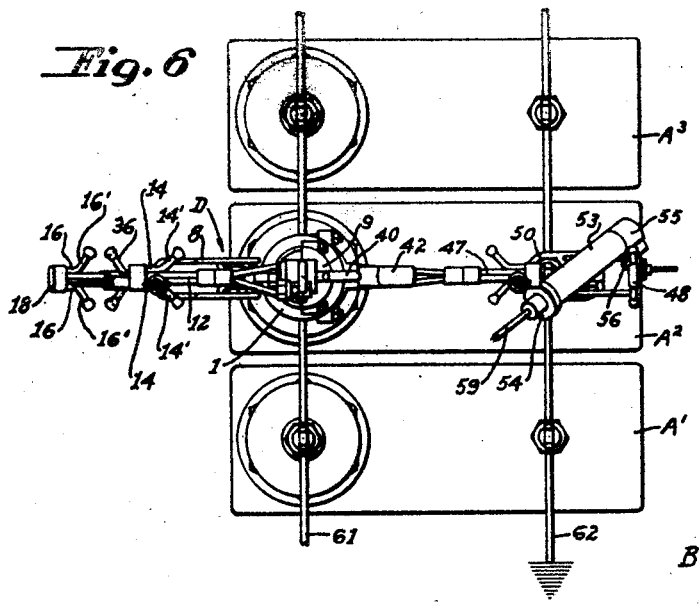
INVENTOR
CHARLES ADIN FOX
ATTORNEY Patented Feb. 10, 1942

2,272,370

UNITED STATES PATENT OFFICE 2,272,370

ELECTRICAL PROTECTIVE DEVICE

Charles Adin Fox, St. Louis, Mo., assignor to James R. Kearney Corporation, St. Louis, Mo., a corporation of Missouri Application June 10, 1939, Serial No. 278,435

7 Claims. (Cl. 200—115)

This invention relates generally to electrical protective devices and more specifically to an improved protective device adapted for use in disconnecting an article of electrical equipment from the power line with which it is associated in the event of internal failure, and for grounding the article of equipment when it has been taken out of service by operation of the protective device, the predominant object of the invention being to provide a device of the type referred to above which is capable of performing its intended function in a highly efficient manner.

The desirability for the use of a condenser or capacity in connection with a power line has been known for a long time, but because of certain mechanical difficulties it has not been practical to build condensers for line service until recent years. The use of line condensers is desirable due to the fact that capacity has an effect opposite to induction, and its addition to an inductive line corrects, or tends to correct, the power factor, thereby reducing the line current with the power consumption. Since the voltage drop is proportional to the current (current multiplied by the resistance or IR drop) any reduction in the current materially improves the voltage condition for the individual consumer.

A line condenser may be installed at almost any place on a line, depending mainly on load conditions, and it is subject, generally, to the same conditions as are transformers. For this reason fuse protection or other means, should be provided to disconnect a condenser from the line with which it is associated in case of internal failure. In this connection it is to be noted that a condenser has a characteristic not possessed by a transformer, in that when a condenser is charged it will remain so when disconnected from a line for a period of time depending on the leakage characteristics of the material of which the condenser is made. This situation makes a condenser a dangerous piece of equipment to touch even when disconnected from a line, as a person in many cases cannot be sure whether or not the condenser is in a charged condition.

Briefly stated the improved protective device disclosed herein, preferably, though not necessarily, takes the general form of a fuse switch of the type disclosed in United States Letters Patent No. 2,086,028, granted on July 6, 1937 in the names of Walter A. Heinrich and Charles Adin Fox. In accordance with this patented structure a fusible link is interposed between a pair of contact arms which are adapted for relative movement away from each other and are normally restrained against such movement by the unfused link. The unfused link is interposed in the circuit protected by the switch structure and when a fault occurs in the circuit the link is fused thereby releasing the contact arms for relative outward movement with the result that the ruptured ends of the fused link are pulled apart to assist in quickly extinguishing an arc formed between the ruptured ends of the link.

By associating with a line condenser a means, such as the patented structure referred to above, for automatically taking the condenser out of service in the event of an internal failure, only a portion of the desired protection would be afforded because, as stated above, the condenser would still be charged after it had been taken out of service by the protective means for a period of time sufficient to permit the charge to leak therefrom. In view of this situation the improved protective device disclosed herein includes means for automatically grounding a condenser substantially simultaneously with its disconnection from its associated line. By so automatically grounding a condenser immediately upon its disconnection from its line the likelihood that a service man, or other person, would be injured by touching a disconnected but charged condenser is entirely eliminated.

An important feature of the improved protective device disclosed herein is that the presence of a ruptured fuse link, and the moved position of a part of the protective device in contact with a grounding contact, gives the maintenance man a visual indication of the discharged condition of the condenser. Thus he may feel free to touch the condenser inasmuch as the charge is discharged therefrom immediately upon disconnection of the condenser from the line. Some condensers have very high resistances connected across the terminals inside the condenser cases for the purpose of discharging the condensers. However this arrangement gives no visual indication as to the charged or discharged condition of the condenser and therefore a maintenance man could not, at any time, be absolutely sure of the condition of the condenser.

Additionally, if desired, the improved protective device disclosed herein may include means for protecting a condenser from lightning disturbances. Such protection may be found to be even more necessary with a condenser than with a transformer inasmuch as a transformer is an inductive piece of equipment and as such will resist the entrance of lightning while a condenser has the opposite effect and may tend to draw lightning to it. In any event if found desirable the improved protective device may include surge protection means, although, obviously, the improved protective device is complete and capable of efficient operation in disconnecting a condenser from its line and grounding the condenser with the surge protection means omitted therefrom.

Fig. 1 is a side elevation of the improved protective device shown in association with a portion of a condenser, said protective device including a surge arrester portions of which are shown in section.

Fig. 2 is a front elevation of the structure illustrated in Fig. 1.

Fig. 3 is an elevation looking toward the opposite or rear end of the structure shown in Fig. 1.

Fig. 4 is an enlarged, fragmentary vertical section illustrating the manner in which the improved protective device is mounted on a condenser.

Fig. 5 is a horizontal section taken on line 5—5 of Fig. 4.

Fig. 6 is a plan view illustrating the manner in which a plurality of condensers are connected together with a single protective device acting to protect the assembly of condensers.

In the drawings, wherein is shown for the purpose of illustration, merely, one embodiment of the invention, A designates a line condenser of conventional construction and arrangement which is provided with a condenser terminal B, the particular condenser terminal illustrated comprising a metallic element having a pair of upstanding legs B' provided with a slot therebetween. The upstanding legs B' of the condenser terminal are externally screwthreaded and have a nut and washer assembly C mounted thereon, which under certain conditions is employed to clamp an electrical conductor in the base of the slot between said legs B'.

Supported by the condenser terminal B is a protective device D which is arranged in accordance with this invention, said protective device including a mounting which preferably includes a tubular insulator 1. At its lower end the tubular insulator is attached to the condenser terminal B through the instrumentality of an element 2 (Fig. 4), said element including a lower, internally screwthreaded, tubular portion 2a which is in screwthreaded engagement with the spaced legs of the condenser terminal B, an annular flange 2b, with the top face of which the lower face of the insulator 1 contacts, and an upstanding portion 2c which is rectangular in cross section and extends upwardly into the interior of the lower portion of the insulator 1. Rotation of the element 2 with respect to the condenser terminal B is prevented by a set screw 3 which is seated in a screwthreaded opening formed through a portion of the element and contacts with a leg B' of said condenser terminal B.

The interior diameter of the tubular insulator 1 is substantially larger than the transverse dimensions of the portion 2c of the element 2 and, as shown in Fig. 4 and 5, a V-shaped washer 4 is interposed between corner edges of the portion 2c and portions of the inner face of the tubular insulator 1 to provide for positive connection between these parts, yet such connection as will not tend to fracture the porcelain or other breakable material of which the insulator is made. The portion 2c of the element 2 is provided with a screwthreaded opening 5 that is alined with an opening formed through the V-shaped washer 4, and extended through the opening of the washer and screwed into the screwthreaded opening of the portion 2c is the shank portion of a bolt 6. The bolt 6 secures the lower terminal 7 of the protective device D to the insulator 1, being extended through an opening formed through said lower terminal, and said bolt secures in place with respect to the lower terminal 7, and relative to the insulator 1, a lower contact arm 8 of the protective device. The lower contact arm 8 will be hereinafter described in detail and therefore for the present it will suffice to point out that this lower contact arm includes an upstanding loop 8' through which the shank portion of the bolt 6 extends. When the bolt 6 is drawn up tight the loop 8' of the lower contact arm is forced by washers behind the head of the bolt against the lower terminal 7, and said lower terminal is forced against the outer face of the insulator 1. Also the V-shaped washer is tightly clamped between corner edges of the portion 2c of the element 2 and portions of the inner face of the insulator 1. It is to be noted that the lower contact arm 8 is in electrical contact with the condenser terminal B through the lower terminal 7, bolt 6 and its associated washers, and the element 2, all of which are formed of electrical conducting material.

Secured to the insulator 1 adjacent to the upper end thereof is an upper terminal 9 which has suitably connected thereto a section of an electrical conductor L which constitutes a part of the power line with which the protective device is associated. The upper terminal 9 includes a portion 9' which partially embraces the upper end of the insulator 1 and a curved rod 10, which embraces the upper portion of the insulator and is connected to the portion 9' of the upper terminal, secures the upper terminal in place with respect to the insulator. The upper terminal has secured to it by means of a bolt 11 an upper contact arm 12 which preferably is formed from a single length of relatively heavy wire. The upper contact arm 12 includes an upwardly extended loop portion 12a through which the shank portion of the bolt 11 extends, there being a washer 13 interposed between the head of the bolt and the loop of the upper contact arm which contacts forcibly with said loop to fix the upper contact arm to the upper terminal. The upper contact arm 12 includes substantially parallel portions extended forwardly from the loop portion 12a, and these forwardly extended portions are bent rearwardly upon themselves at the forward end of the upper contact arm, as indicated at 14 in Fig. 6 to provide opposed gripping portions. Also the rearwardly bent portions 14 are flared outwardly as indicated at 14' in Fig. 6.

The lower contact arm 8 is likewise formed preferably from a single length of relatively heavy and inherently resilient wire and it includes substantially parallel portions that extend forwardly from the lower end of the loop portion 8' of said lower contact arm. The substantially parallel, forwardly extended portions of the lower contact arm have helically wound portions 15 formed therein which give increased resiliency to the lower contact arm and tend to move the outer end portion of said arm downwardly. Also said substantially parallel, forwardly extended portions of the lower contact arm are provided at their outer ends with rearwardly bent gripping portions 16, the rear portions of which are flared outwardly as indicated at 16' in Fig. 6. The upper contact arm 12 and the lower contact arm 8 are provided with sleeves 17 which embrace and retain the substantially parallel, forwardly extended portions of said arms in their proper relative positions. Also said upper and lower contact arms are provided with caps 18 at their outer ends which serve the same purpose served by the sleeves 17, but with respect to the forward end portions of said substantially parallel, forwardly extended portions of the arms.

The protective device disclosed herein includes a fuse link 19 comprised of a pair of conductors 20 and 21 which extend outwardly in opposite directions from the opposite ends of an expulsion tube 22, said conductors being provided at their opposite outer ends with loops 23. Also the conductors 20 and 21 may have soldered or otherwise secured thereto, flanged collars 24. The inner end portions of the conductors 20 and 21 are disposed in the expulsion tube 22 and said inner end portions of said conductors are suitably connected together to provide a fusible section 25 which is located within the expulsion tube 22. The expulsion tube 22 is interposed between washers 26 and 26', said washers contacting with the opposite end faces of the expulsion tube without any positive attachment between the washers and the expulsion tube. The washer 26 is soldered, or otherwise secured, to the conductor 20 while the washer 26' is free of attachment to the conductor 21, there being a contracted coil spring 27 interposed between said washer 26' and an abutment 27' secured to the conductor 21 which serves to keep the fuse element taut when not in service thereby preventing breaking of the fuse element from vibration or shocks.

In applying the fuse link 19 to the upper and lower contacts arms of the improved structure in the fusing positions, the prong at one end of an ordinary insulated switch stick is inserted through the loop 23 of the conductor 20 and the fuse link is elevated and moved with respect to the lower contact arm so as to draw a portion of the conductor 21 which is located adjacent to the flanged collar 24 into one of the gripping portions at the outer end of said lower contact arm provided by the rearwardly bent portions 16 of said lower contact arm. When the portion of the conductor 21 is being drawn into a gripping portion of the lower contact arm as described the flared portion 16' of the gripping portion assists in the passage of the conductor portion into the gripping portion. At this time the lower contact arm is in a lowered position, as suggested by dotted lines in Fig. 1, and the fuse link is raised against the restraining force exerted by the helical portions 19 of the lower contact arm and the inherent resiliency of said lower contact arm until the fuse link reaches a high enough elevation to permit a portion of the conductor 20 to be drawn into one of the gripping portions at the outer end of the upper contact arm provided by the rearwardly bent portions 16, the flared portion 14' of the gripping portion here also assisting in the entrance of the conductor portion into said gripping portion. The fusing operation is then completed and the switch stick is removed, the result of the fuse link being assembled with the upper and lower contact arms as described being that the fuse link is held under tension by the contact arms. Thus, when the fuse link is ruptured by a failure, the lower contact is relieved of the restraint normally imposed thereon by the unfused fuse link and said lower contact arm will immediately swing downwardly thereby jerking the lower conductor 21 out of the expulsion tube 22. As previously mentioned herein the coil spring 27 also assists in quickly separating the ruptured ends of the fuse link.

When the fuse link 19 has been ruptured and the protective device D is operated as described above the condenser A will be disconnected from the power line with which it is normally associated. However an additional function of the protective device is to ground the condenser immediately upon the disconnection thereof from the line. This function is accomplished by providing the protective device with a ground contact element 28 which is secured by suitable fastening means 29 to a metallic member 30 which in turn is secured by fastening means 31 to metallic portion 32 that is in electrical contact with the casing of the condenser A. The ground contact 28 is preferably formed from a single length of relatively heavy wire which is bent to provide a loop portion 28' at the inner end thereof through which the shank portion of the fastening means 29 extends. From the loop portion 28' substantially parallel portions 33 of the length of wire of which the ground contact is made, extend upwardly and outwardly at an angle as shown in Fig. 1, said portions 33 being retained in their proper relative positions by embracing sleeves 34. At the outer end of the substantially parallel portions 33 opposed portions of the ground contact are bent outwardly to provide separated portions 35 to which flared portions 36 of the ground contact lead (Fig. 2), the arrangement being such that a restricted passageway 37 is provided at the inner portions of the flared portions 36 which leads into the wider space between the separated portions 35.

In the operation of the improved protective device an internal failure will cause the fuse link to be ruptured, as has been previously explained herein, with the result that the condenser with which the protective device is associated will be disconnected from the power line with which it is associated. As the lower contact arm 8 swings downwardly, when freed from the restraint normally imposed thereon by an unruptured fuse link, it moves into contact with the ground contact 28, passing between the flared, centering portions 36 of the ground contact and through the restricted passageway 37, in contact with the portions of the ground contact that provides said restricted passageway, and into the space between the separated portions 35. When the lower contact arm moves through the restricted passageway 37 of the ground contact in contact with the ground contact portions at opposite sides of said restricted passageway, the condenser is immediately grounded, the energy passing from the condenser by way of the terminal B, element 2, bolt 6, lower terminal 7, and lower contact arm 8 to the grounding contact 28, and from said grounding contact to the ground wire G by way of the member 30, portion 32, the casing of the condenser and the ground wire terminal G'.

From the foregoing it is plain that when a failure occurs the condenser is disconnected from the power line, and practically simultaneous with such operation the condenser is grounded so that it may be worked on with safety.

When it is desired to provide the improved protective device with surge arresting means for affording lightning protection to an associated condenser, the upper terminal 9 has associated with it an arcing horn 40, said arcing horn including a horizontal portion 40' which is disposed in an opening formed in the upper terminal and is fixed therein by a set screw 41. Associated with the arcing horn 40 is a second arcing horn 42 which is secured at its lower end by means of a fastening device 43 to a support 44, said support being attached to the insulator I by a curved rod 45 that embraces said insulator and is secured by nuts 45' to the support. The arcing horns 40 and 42 are so shaped and arranged that an air gap 46 is provided between portions thereof. The fastening device 43 serves to secure to the support 44 an upper arm 47 which is constructed in substantial accordance with the upper contact arm 12 of the protective device D; that is to say said arm 47 is formed from a single length of relatively heavy wire bent to provide the arm 47 with a loop portion 47', substantially parallel portions which extend forwardly from said loop portion, and rearwardly bent portions 47a at the outer end of the arm 47 to provide gripping portions.

The lightning protection means includes also a lower arm 48 which is made in substantial accordance with the lower contact arm 8 of the protective device D. In other words, the lower arm 48 is made from a single length of relatively heavy wire bent to provide a loop portion 48', substantially parallel, spaced apart portions extended from said loop and having helically wound portions 49 formed thereon to give increased resiliency to the lower arm 48, and outer contacting parallel portions which include backwardly bent portions 48a to provide the lower arm 48 with gripping portions at its outer end. The lower arm 48 is secured to a member 50 which is clamped in electrical contact with the ground wire G, the ground wire terminal having a nut 51 and washer 52 associated therewith which serves to clamp the member 50 and ground wire G together as described.

The lightning protection means in addition includes a surge unit which comprises a tube 53 formed of suitable electrical insulating material which supports terminals 54 and 55 at opposite ends thereof. Each of the terminals 54 and 55 has a length of flexible conductor mechanically and electrically connected thereto and these conductors are adapted to be drawn into gripping portions of the arms 47 and 48 to support the surge unit between said arms. As shown in Fig. 1 the conductors 56 associated with the terminals 54 and 55 are provided with loops 56' at their outer ends to facilitate association of the surge unit with the arms 47 and 48. Arranged within the tube 53 is an inner tube 57 and an intermediate tube 58, the inner tube 57 being formed of horn fiber, or other material characterized by the ability to give off gas in the presence of an electric arc that tends to extinguish the arc. Also supported by the terminal 54 is an electrode 59 that extends into the interior of the inner tube 57 the proper distance to provide a gap within said inner tube between the inner end of the electrode and the terminal 55. The electrode 59 extends through an opening formed through the terminal 54 and a set screw 60 secures the electrode in place, the electrode being adjustable to different positions longitudinally of the inner tube 57 to provide gaps within said tube of varying lengths.

When, in the use of the improved protective device a surge on the line L seeks a path to ground it will form an arc across the air gap 46 (which normally keeps the line potential off of the surge unit) and across the gap between the inner end of the electrode 59 and the terminal 55. A follow up power arc will be established between said inner end of the electrode 59 and said terminal 55 and this follow up power arc will be extinguished by the gas given off by the horn fiber inner tube 57 in the presence of the arc. If, however, the surge unit fails, for any reason, to properly extinguish the power arc, the continuance of the arc will destroy the tubes 53, 57 and 58, and when the tubes have been burned through so as to separate the opposite end portions thereof the arm 48 will swing outwardly at its upper end in response to force imparted by the helically wound portions 49 of the arm to jerk the terminal 55 away from the electrode 59 and thereby free the device from ground by creating an air gap which will prevent reestablishment of an arc.

In Fig. 6 I illustrate an arrangement where a single protective device D of the type disclosed herein is employed to protect a plurality of condensers $A^1$, $A^2$ and $A^3$. In accordance with this arrangement the plurality of condensers are connected together by a conductor 61 which is clamped in the bases of the slots between the legs B' of the condenser terminals B by the nut and washer assemblies C, and one of the protective devices is associated with one of the condensers. Also in accordance with this arrangement all of the condensers are connected to a common conductor 62 leading to ground, said conductor 62 being secured to the ground wire terminals G' of the condensers by the bolt and washer assemblies 51—52. The operation of a protective device arranged as shown in Fig. 6 is the same as the operation already described herein where one of the protective devices is associated with a single condenser.

I claim:

1. A protective device adapted for association with an article of electrical equipment, comprising an insulating support, a terminal mounted on said insulating support to which is connected a power line that conducts electrical energy to the article of electrical equipment with which the protective device is associated, an arm electrically and mechanically connected to said terminal, a movable arm supported by said insulating support in spaced relation relative to the first-mentioned arm, a fusible link connected to said arms and normally restraining said movable arm against movement, said terminal, said arms and said fusible link being parts of the electrical path leading to the article of electrical equipment with which the protective device is associated and said fusible link being adapted to be ruptured by an electrical failure to release said movable arm for movement, a grounding contact adapted to be electrically connected to the article of electrical equipment with which the protective device is associated and adapted to receive in contact therewith said movable arm when same is released by rupture of said fusible link whereby the article of electrical equipment is successively disconnected and grounded during a single continuous operation of the device, and surge arresting means for protecting an article of electrical equipment with which the protective device is associated from surges, resulting from lightening and other causes, said surge arresting means including a pair of spaced elements providing an air gap therebetween one of which is electrically and mechanically connected to said terminal, and spaced arms between which a surge unit is supported in contact therewith.

2. A protective device adapted for association with an article of electrical equipment, comprising an insulating support, a terminal mounted on said insulating support to which is connected a power line that conducts electrical energy to the article of electrical equipment with which the protective device is associated, an arm electrically and mechanically connected to said terminal, a movable arm supported by said insulating support in spaced relation relative to the first-mentioned arm, a fusible link connected to said arms and normally restraining said movable arm against movement, said terminal, said arms and said fusible link being parts of the electrical path leading to the article of electrical equipment with which the protective device is associated and said fusible link being adapted to be ruptured by an electrical failure to release said movable arm for movement, a grounding contact adapted to be electrically connected to the article of electrical equipment with which the protective device is associated and adapted to receive in contact therewith said movable arm when same is released by rupture of said fusible link whereby the article of electrical equipment is successively disconnected and grounded during a single continuous operation of the device, and surge arresting means for protecting an article of electrical equipment with which the protective device is associated from surges, resulting from lightening and other causes, said surge arresting means including a pair of spaced elements providing an air gap therebetween one of which is electrically and mechanically connected to said terminal, and spaced arms between which a surge unit is supported in contact therewith, one of said arms which support said surge unit being adapted for movement whereby in the event of destruction of said surge unit a portion of said movable arm of the surge arresting means will move in a direction away from the associated arm of said surge arresting means.

3. A protective device adapted for association with an article of electrical equipment, comprising an insulating support, a terminal mounted on said insulating support to which is connected a power line that conducts electrical energy to the article of electrical equipment with which the protective device is associated, an arm electrically and mechanically connected to said terminal, a movable arm supported by said insulating support in spaced relation relative to the first-mentioned arm, a fusible link connected to said arms and normally restraining said movable arm against movement, said terminal, said arms and said fusible link being parts of the electrical path leading to the article of electrical equipment with which the protective device is associated and said fusible link being adapted to be ruptured by an electrical failure to release said movable arm for movement, a grounding contact adapted to be electrically connected to the article of electrical equipment with which the protective device is associated and adapted to receive in contact therewith said movable arm when same is released by rupture of said fusible link whereby the article of electrical equipment is successively disconnected and grounded during a single continuous operation of the device, and surge arresting means for protecting an article of electrical equipment with which the protective device is associated from surges, resulting from lightening and other causes, said surge arresting means including a pair of spaced elements providing an air gap therebetween one of which is electrically and mechanically connected to said terminal, and spaced arms between which a surge unit is supported in contact therewith, one of said arms which support said surge unit being resilient and adapted for movement whereby in the event of destruction of said surge unit a portion of said movable arm of the surge arresting means will move in a direction away from the associated arm of said surge arresting means.

4. In combination with a line condenser, a protective device for automatically disconnecting said line condenser from its normal electrical connection to a power line upon occurrence of an electrical failure, said protective device comprising an elongated insulator supported by and disposed in alinement with the terminal of said line condenser, coupling means formed of electrical conducting material for detachably securing said elongated insulator at an end thereof to the terminal of said condenser, a movable element supported by said elongated insulator for movement, means for electrically connecting said movable element to said coupling means, releasable means for normally restraining said movable element against movement and for permitting said movable element to move when said releasable means is released by an electrical failure, said releasable means being a part of the electrical path leading from the power line to said condenser, and a grounding contact electrically connected to a part of said condenser and adapted to receive in contact therewith said movable element when same is released by said releasable means, whereby said condenser is successively disconnected from the power line and grounded during a single operation of the protective device.

5. In combination with a line condenser, a protective device for automatically disconnecting said line condenser from its normal electrical connection to a power line upon occurrence of an electrical failure, said protective device comprising an elongated insulator supported by and disposed in alinement with the terminal of said line condenser, coupling means formed of electrical conducting material for detachably securing said elongated insulator at an end thereof to the terminal of said condenser, a movable element supported by said elongated insulator for movement, means for electrically connecting said movable element to said coupling means, releasable means comprising a fuse link for normally restraining said movable element against movement and for permitting said movable element to move when said releasable means is released by an electrical failure, said releasable means being a part of the electrical path leading from the power line to said condenser, and a grounding contact electrically connected to a part of said condenser and adapted to receive in contact therewith said movable element when same is released by said releasable means, whereby said condenser is successively disconnected from the power line and grounded during a single operation of the protective device.

6. In combination with a line condenser, a protective device for automatically disconnecting said line condenser from its normal electrical connection to a power line upon occurrence of an electrical failure, said protective device comprising an elongated insulator supported by and disposed in alinement with the terminal of said line condenser, coupling means formed of electrical conducting material for detachably securing said elongated insulator at an end thereof to the terminal of said condenser, a movable element supported by said elongated insulator for movement, means for securing said movable element to said elongated insulator and for electrically connecting said movable element to said coupling means, releasable means comprising a fuse link for normally restraining said movable element against movement and for permitting said movable element to move when said releasable means is released by an electrical failure, said releasable means being a part of the electrical path leading from the power line to said condenser, and a grounding contact electrically connected to a part of said condenser and adapted to receive in contact therewith said movable element when same is released by said releasable means, whereby said condenser is successively disconnected from the power line and grounded during a single operation of the protective device.

7. In combination with a line condenser, a protective device for automatically disconnecting said line condenser from its normal electrical connection to a power line upon occurrence of an electrical failure, said protective device comprising an elongated insulator supported by and disposed in alinement with the terminal of said line condenser, coupling means formed of electrical conducting material for detachably securing said elongated insulator at an end thereof to the terminal of said condenser, a movable element supported by said elongated insulator for movement, means comprising a fastening member which engages said movable element and said coupling means for securing said movable element to said elongated insulator and for electrically connecting said movable element to said coupling means, releasable means comprising a fuse link for normally restraining said movable element against movement and for permitting said movable element to move when said releasable means is released by an electrical failure, said releasable means being a part of the electrical path leading from the power line to said condenser, and a grounding contact electrically connected to a part of said condenser and adapted to receive in contact therewith said movable element when same is released by said releasable means, whereby said condenser is successively disconnected from the power line and grounded during a single operation of the protective device.

CHARLES ADIN FOX.